TRANSMIT-RECEIVE SWITCH

Filed Oct. 15, 1965

λ = NOMINAL WAVELENGTH OF OPERATING FREQUENCY

INVENTOR.
KARL W. ANGEL
BY
Edward J Norton
Attorney

United States Patent Office 3,452,299

Patented June 24, 1969

3,452,299

TRANSMIT-RECEIVE SWITCH

Karl W. Angel, Pittsburgh, Pa., assignor to Radio Corporation of America, a corporation of Delaware Filed Oct. 15, 1965, Ser. No. 496,257
Int. Cl. H01p *5/12, 1/04*
U.S. Cl. 333—7 12 Claims

ABSTRACT OF THE DISCLOSURE

A novel means for switching the terminals of a common antenna from a receiver input circuit to a transmitter output circuit and vice versa is provided by using a pair of semiconductor devices each of which operates only during avalanche conditions. The first semiconductor device is placed in series with the transmitter output circuit and the second semiconductor device is connected in shunt across the receiver input circuit at a point with respect to the antenna terminals to reflect a high impedance to the terminals upon conduction of the second semiconductor device. When the transmitter is energized, both devices conduct switching RF current from the transmitter output circuit to the antenna and isolating the receiver. When the RF signals are received at the antenna neither device conducts, and the received signals are applied to the receiver.

The present invention relates to radio communication apparatus and particularly to a radio antenna transmit-receive switch.

When a radio transmitter and radio receiver use the same antenna, provision must be made for isolating the receiver during periods of transmission to protect the receiver from damage and to prevent the receiver from dissipating the power from the transmitter. In the past, various types of circuit configurations, for example, diode pairs including two parallel diodes of opposite polarity, have been used to perform the transmit-receive switching function. The present invention uses semiconductor devices that operate in their avalanche breakdown regions to provide a simplified, automatic, transmit-receive switch device.

Accordingly, it is an object of this invention to provide an improved antenna transmit-receive switching circuit of simplified operation.

It is a further object to provide an improved antenna transmit-receive switch which, by using the RF power from the transmitter to provide switching action, requires no local power supply.

It is another object to provide even order harmonic cancellation for a solid state antenna switch.

It is another object to provide an improved antenna transmit-receive switch operated from the transmitter RF signal and protected from operation by undesired external RF signals.

Briefly, the transmit-receive switch includes, according to one embodiment of the invention, an input circuit for coupling an RF input signal from an antenna to the receiver and an output circuit for coupling an RF signal from the transmitter to the same or common antenna. A semiconductor device which operates to conduct only during avalanche conditions is placed in shunt across the receiver input circuit at a point one-quarter wavelength from the antenna at the transmitter operating frequency. A similar semiconductor device is placed in series with the transmitter output circuit. When the transmitter is energized, both semiconductor devices conduct, switching RF current from the transmitter to the antenna and also providing isolation to the receiver. RF signals received at the antenna from external sources are not of proper magnitudes to provide avalanche operation of the semiconductor devices. Therefore, received RF signals are applied to the receiver and do not pass into the transmitter.

For a better understanding of the invention together with other further objects thereof, reference should be made to the following detailed description which is to be read in conjunction with the accompanying drawings in which.

In accordance with an embodiment of the invention, two PNPN unidirectional semiconductor devices are used. These devices are more commonly known as four-layer diodes. By way of example, the diodes may be modified I.T.&T. 4E50–8 semiconductor diodes which provide switching action when a voltage from 40 to 60 volts is applied across the diode and a holding or sustaining current from 1 to 50 ma. is maintained. Instead of the diodes mentioned above, a silicon controlled rectifier, a three-layer "trigger" diode, and other such devices having similar avalanche regions can be used. The devices must have, to be usable in the present invention, a critical avalanche breakdown voltage for RF frequencies where a low impedance state is assumed and critical sustaining current by which the low impedance state is maintained. The two terminal (diode) devices are often better suited to given application than the three-terminal (transistor or silicon control rectifier) devices because of circuit simplicity.

Operation of the PNPN semiconductor device depends upon a sufficient amount of avalanche voltage across this device in a forward direction to overcome the reverse biased NP center junction. Once the critical avalanche breakdown of the junction is overcome, the current increases to at least the sustaining level and the diode operates in its low impedance passing through its negative resistance region; thereby giving a rapid change of impedance state from very high to very low. The critical avalanche breakdown voltage of the particular PNPN device mentioned above is between 40 and 60 volts, and the critical holding current level is between 1 and 50 ma. When the voltage across the diode is reduced below the holding voltage and the current is below the holding value, the device returns to its high impedance state. A fixed amount of time, however, is required once the voltage across the semiconductor diode is below the holding voltage and the current is below the holding value before the carriers across the center junction cease and the semiconductor diode actually returns to its high impedance state. During this period, a second avalanche breakdown voltage and associated holding current can be applied across the PNPN semiconductor diode to continue to hold the diode device in the conducting state. Such a rapid change or switching of voltage values is present at RF frequencies.

Figure 1:
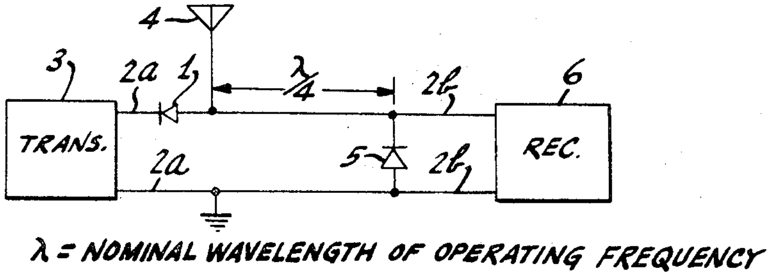
FIG. 1 is a circuit diagram illustrating one embodiment of an antenna transmit-receive switch of the present invention.

Turning now to FIG. 1 a PNPN semiconductor device 1 of the type described above is connected in series with one side of the transmit portion 2*a* of a transmission line 2. In this particular embodiment, the cathode of the PNPN semiconductor device 1 is connected to one side of the output of a transmitter 3, and the anode of diode device 1 is connected to common antenna 4. The other side of transmission line portion 2*a* is connected to the other output side of the transmitter 3 and to ground or a suitable point of reference potential. Upon the avalanche breakdown a negative half-cycle RF energy being provided across the PNPN semiconductor device 1, for example, 40–60 volts using the PNPN device described above, the semiconductor device 1 conducts, switching the transmit current to common antenna 4. The PNPN semiconductor diode device 1 operates equally well with the diode device turned around so as to switch during the positive half-cycle.

A second PNPN semiconductor diode device 5 of the type described previously is connected in shunt across the receiver portion 2*b* of transmission line 2 with the cathode of diode 5 connected to the junction of one side of the receiver 6 input and common antenna 4. The anode of diode 5 along with the other input side of the receiver 6 is connected to ground. The semiconductor diode device 5 is placed one-quarter wavelength at the transmitter operating frequency from common antenna 4. When the transmitter is energized providing high level RF signals to the common antenna, a high impedance exists across the point where the PNPN semiconductor device 5 is connected one-quarter wavelength from the common antenna. When the voltage across the PNPN semiconductor device 5 exceeds the critical breakdown voltage for the device 5 on the negative half cycle as described previously, the diode 5 conducts isolating the receiver 6 from the transmitter output by providing a high impedance by means of the quarter wave section across the terminals of common antenna 4. The PNPN semiconductor device 5 operates equally well with a diode device turned around so as to switch during the positive half-cycle. The PNPN semiconductor devices 1 and 5 are connected in the manner shown in FIG. 1 to provide better dissipation of heat and even order harmonic cancellation.

In over-all operation, the transmitter 3 supplies RF energy at its output terminals. Each time the transmitter supplies the critical breakdown voltage across semiconductor devices 1 and 5, the semiconductor device 1 conducts, switching the transmit current to antenna 4. Semiconductor device 5 also conducts, shorting the transmitter signal and isolating the receiver 6 from the transmitter 3 output. During reception, the diode devices 1 and 5 are in their nonconducting, high impedance state. The received RF signals are not of sufficient magnitude to turn on the PNPN semiconductor diode devices 1 and 5 and therefore the entire received signal is placed across the input of the receiver 6.

Figure 2:
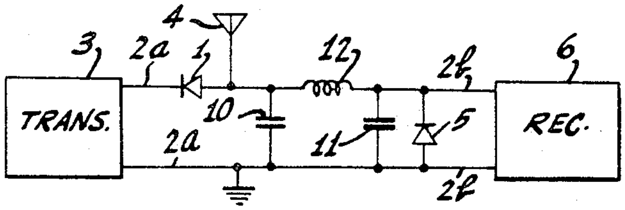
FIG. 2 is a circuit diagram illustrating a second embodiment of an antenna transmit-receive switch of the present invention.

FIG. 2 shows in place of the one-quarter wave section of FIG. 1 a low pass filter section comprising capacitors 10, 11 and inductor 12. The filter section is positioned between the common antenna 4 and PNPN semiconductor device 5 shown in FIG. 1. When the transmitter 3 is energized providing high level RF signals to common antenna 4, the filter section comprising capacitors 10, 11 and inductor 12 provides a high impedance across the point where the PNPN semiconductor device 5 is connected. When the voltage across the PNPN semiconductor device 5 exceeds the critical breakdown voltage in the forward direction, the diode conducts, isolating the receiver 6 from the transmitter 3 signals by virtue of parallel resonance provided by the selected values of capacitor 10 and inductor 12. This parallel resonance like the quarter wave section provides a high impedance between the receiver 6 and common antenna 4.

Because conduction is better in one direction than in the reverse direction, even order harmonic generation takes place in semiconductor switches. An additional feature of the circuit described in this disclosure is the ability of this circuit when the semiconductor devices are connected in the proper polarity with respect to each other to provide cancellation of such even order harmonics. With the circuit connected in the manner shown in FIG. 1, the one-quarter wave section reflects the even order harmonics generated across PNPN semiconductor diode device 5 that are 180 degrees out of phase with those generated across PNPN semiconductor device 1 and thereby provides even order harmonic cancellation for the solid state switch. The degree of cancellation depends on the semiconductor device characteristic balance and the tuning of the one-quarter wave resonant line. The one-quarter wave line section can be replaced by a low pass filter section as in FIG. 2, the parameter values of which are selected so as to reflect the even order harmonics generated across device 5 that are 180 degrees out of phase with those generated across PNPN diode device 1 and thereby provide the even order harmonic cancellation.

Figure 3:
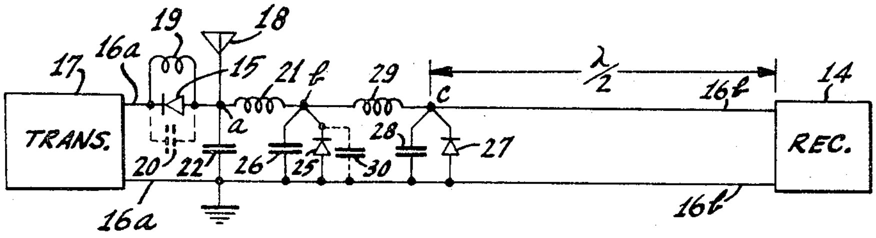
FIG. 3 is a circuit diagram illustrating still another embodiment of an antenna transmit-receive switch of the invention.

Although the PNPN semiconductor diode device 1 conducts only during transmission periods when high voltages are applied across the device, some of the low level received signals at the antenna 4 may be coupled into the transmitter 3 by way of the capacitance across the PNPN semiconductor diode device 1. FIG. 3 shows PNPN semiconductor diode device 15 which is connected in series with the transmit portion 16*a* of transmission line 16 between transmitter 17 and common antenna 18. An inductance 19 is placed across PNPN semiconductor device 15. By placing the proper inductance 19 across this semiconductor device 15 in the manner shown, the capacitance 20 of the device 15, indicated by dotted lines, will be tuned out and the transmitter 17 will be isolated from the receiver 14 during reception of operating frequencies.

Under some power level and receiving tuning conditions the receiver may load the PNPN semiconductor diode, such as diode 25 shown in FIG. 3, so that this diode cannot switch on and protect the receiver. This problem does not occur across the series connected diode such as PNPN semiconductor diode 15 since the antenna load is removed until the diode avalanche occurs.

A parallel tuned circuit can be provided which develops sufficient voltage across the PNPN semiconductor diode so that the PNPN semiconductor diode 25 can protect the receiver. FIG. 3 shows antenna 18 connected to one side of the transmission line 16 at point A. The PNPN semiconductor diode 25 is connected in shunt across the input circuit of the receiver 14 at the receive portion 16*b* of transmission line 16. A capacitor 26 is connected across the semiconductor diode device 25, the junction capacitance 30 of the device 25 being shown in dotted lines. A standard low voltage switching diode 27 is connected with the polarity shown in shunt across the receiver portion 16*b* of transmission line 16. This low power operating diode 27 might well be the receiver first transistor base-emitter junction. Across low power switching diode 27 is connected capacitor 28. An inductor 29 is connected between the cathodes of diodes 25 and 27. Upon the application of transmitter power, low power switching diode 27 conducts, shorting point C to ground and providing a parallel resonant circuit which is made up of capacitors 26 and 30 and inductor 29. The high impedance provided by the parallel resonant circuit rapidly provides the critical avalanche breakdown voltage across PNPN semiconductor diode 25.

In the manner shown in FIG. 2, the parallel tuned circuit made up of inductor 21 and capacitor 22 provides a high impedance at the transmitter operating frequency. The high impedance provided by the parallel resonant circuit made up of inductor 29 and capacitors 26 and 30 provides a reflected wave that when added to the incident wave provided by the transmitter sufficiently increases the voltage that appears at point B over that at point A so as to cause PNPN semiconductor diode device 25 to conduct and thereby isolate the receiver 14. Two quarter wave-length sections can be used in place of the two low pass filter sections made up of inductors 21 and 29 and capacitors 22, 26, 28 and 30. The desired RF low level signals received at the antenna 18 are applied across the receiver 14 because they are insufficient to provide a high enough voltage level to cause PNPN semiconductor diode device 25 and semiconductor diode 27 to conduct and isolate the receiver. The circuit elements between antenna 18 and receiver 14 provide a proper matching transmission line during reception of the RF signals.

One of the problems associated with antenna switching using transmitter power is that nearby high power transmitters can under certain conditions also operate the switching means and thereby interrupt operation. FIG. 3 illustrates a circuit for preventing conduction of the low voltage diode 27 in the presence of nearby "off channel" signals. The input tuned circuits of the receiver 14 are used to prevent the "off channel" signals from turning the receiver 14 off. Diode 27 is shown connected one-half wavelength from the receiver 14 at the receiver operating frequency band. This construction provides a short circuit to the "off channel" signals at the input of the receiver 14. Diode 27 being connected one-half wavelength from the short circuit position at the input of receiver 14 is located at a low voltage point and will therefore not conduct for "off channel" signals. Upon signals being fed to the antenna 18 from the transmitter 17, a high impedance state exists across the input of the receiver 14. This provides a corresponding high voltage across diode 27 located one-half wavelength at the receiver operating frequency from the input tuned circuits of receiver 14 and causes conduction of diode 27. In this manner, the input tuned circuits of the receiver 14 are used to prevent unwanted transmitter signals from turning the receiver off. Diode 27 may also be located following the receiver input selectivity.

While there has been disclosed what is at the present considered to be the preferred embodiment of the invention, it will be understood that various modifications thereof may be made within the true spirit and scope of the invention as set forth in the appended claims.

What is claimed is:

1. A switching circuit comprising in combination,
a pair of terminals,
a first circuit for applying input signals from said terminals to a receiving device,
a second circuit for applying signals from a transmittng device to said terminals,
first and second four-zone semiconductor devices of the type wherein said zones are in succession with the contiguous zones being of opposite conductivity type, and wherein each device has an avalanche breakdown voltage somewhere within the range of the applied voltages of said signals from said transmitting device at which a low impedance state is assumed and a critical sustaining current by which said low impedance state is maintained, said low impedance state being characterized by a voltage across the device which is substantially less than said breakdown voltage,
said first semiconductor device being connected in shunt in said first circuit across the input of said receiving device so as to provide solely during transmission of said signals from said transmitting device in response to said avalanche breakdown voltage a low impedance across the input of said receiving device and a high impedance between said receiving device and said terminals, and
said second semiconductor device being connected in series in said second circuit and being responsive solely to said signals from said transmitting device to assume said low impedance state to provide a low impedance path between said transmitting device and said terminals.

2. A switching circuit comprising in combination,
a pair of terminals,
a first circuit for applying input signals from said terminals to a receiving device,
a second circuit for applying signals from a transmitting device to said terminals,
first and second PNPN semiconductor devices each having an avalanche breakdown voltage somewhere within the range of the applied voltages of said signals from said transmitting device at which a low impedance state is assumed and a critical sustaining current by which said low impedance state is maintained, said low impedance state being characterized by a voltage across the device which is substantially less than said breakdown voltage,
said first PNPN semiconductor device being connected in shunt in said first circuit across the input of said receiving device at an odd multiple of one-quarter wavelengths from said terminals with respect to said signals from said transmitter to provide a low impedance across the input of said receiving device solely during transmission of said signal from said transmitting device in response to said avalanche breakdown voltage and a high impedance between said receiver and said terminal by operation of the said low impedance at said point an odd multiple of one-quarter wavelengths from said terminal,
said second PNPN semiconductor device being connected in series in said second circuit and being responsive solely to said signals from said transmitting device to assume said low impedance state to provide a low impedance path between said transmitting device and said terminals only during the presence of said signals from said transmitting device.

3. A switching circuit comprising in combination,
a pair of terminals,
a first circuit for applying input signals from said terminals to a receiving device,
a second circuit for applying signals from a transmitting device to said terminals,
first and second PNPN semiconductor devices each having an avalanche breakdown voltage somewhere within the range of the applied voltages of said signals from said transmitting device at which a low impedance state is assumed and a critical sustaining current by which said low impedance state is maintained, said low impedance state being characterized by a voltage across the device which is substantially less than said breakdown voltage,
said first PNPN semiconductor device being connected in shunt in said first circuit across the input of said receiving device,
a matching filter section connected between said terminals and said first PNPN semiconductor device and responsive to said signals from said transmitting device to provide said avalanche breakdown voltage across said first semiconductor device,
said first PNPN semiconductor device being with the operation of said matching filter section responsive solely to said signals from said transmitting device to assume said low impedance state and provide said low impedance across the input of said receiving device and a high impedance between said receiving device and said terminals by the parallel tuning of said matching filter section during the operation of said low impedance state, and
said second PNPN semiconductor device being connected in series in said second circuit and being responsive solely to said signals from said transmitting device to assume said low impedance state to provide a low impedance path between said transmitting device and said terminals only during the presence of said transmitted signals.

4. A switching circuit comprising in combination,
a pair of terminals,
a first circuit for applying input signals from said terminals to a receiving device,
a second circuit for applying signals from a transmitting device to said terminals,
first and second PNPN unidirectional semiconductor devices each having an avalanche breakdown voltage somewhere within the range of the applied voltages of said signals from said transmitting device at which the center high impedance NP junction is overcome and a low impedance state is assumed and a critical sustaining current by which said low impedance state is maintained, said low impedance state being characterized by a voltage across the device which is substantially less than said breakdown voltage, said first PNPN unidirectional semiconductor device being connected in shunt in said first circuit across the input of said receiving device at an odd multiple of one-quarter wavelengths from said terminals with respect to said signals from said transmitter so as to provide in the presence of said signals from said transmitting device said avalanche breakdown voltage across said first PNPN unidirectional semiconductor device, said first PNPN unidirectional semiconductor device being responsive solely to said signals from said transmitting device to assume said low impedance state and to provide only during the presence of said signals from said transmitting device a low impedance across the input of said receiving device and a high impedance between said receiving device and said terminals by the operation of said low impedance at said point an odd multiple of one-quarter wavelengths from said terminals, and said second PNPN unidirectional semiconductor device being connected in series in said second circuit and being responsive solely to said signals from said transmitting device to assume said low impedance state to provide a low impedance path between said transmitting device and said terminals only during the presence of said signals from said transmitting device.

5. A switching circuit comprising in combination, a terminal suitable for connection to an antenna, a first circuit for applying input signals from said terminal to a receiving device, a second circuit for applying signals from a transmitting device to said terminal, a first and second PNPN unidirectional semiconductor devices each having an avalanche breakdown voltage at which the high impedance center NP junction is overcome and a low impedance state is assumed and a critical sustaining current by which said low impedance state is maintained, said first PNPN unidirectional semiconductor device being connected in shunt in said first circuit across the input of said receiving device, a first capacitor connected in shunt across said first circuit at said terminal, a second capacitor connected across said first PNPN unidirectional semiconductor device, a first inductor connected between like terminals of said first and second capacitor, said first and second capacitors and said first inductor providing a matching filter section between said terminal and said first PNPN unidirectional semiconductor device, said first PNPN unidirectional semiconductor device with the operation of said matching filter section being responsive solely to said signals from said transmitting device to assume said low impedance state and provide a low impedance across said second capacitor only during the presence of said signals from said transmitting device and switch the tuned circuit comprising said first capacitor and said first inductor in shunt across said first circuit at said terminal to provide a high impedance between said terminal and said receiving device so as to isolate said signals from said transmitting device from said receiving device, and said second PNPN unidirectional semiconductor device being connected in series in said second circuit and being responsive solely to said signals from said transmitting device to assume said low impedance state to provide a low impedance path between said transmitting device and said terminal only during the presence of said signals from said transmitting device.

6. A transmit-receive switch comprising in combination, a terminal suitable for connection to an antenna, a first circuit for applying input signals from said terminal to a receiving device, a second circuit for applying signals from a transmitting device to said terminal, first and second semiconductor devices each having an avalanche breakdown voltage at which a low impedance state is assumed and a critical sustaining current by which said low impedance state is maintained, said first semiconductor device being connected in series in said second circuit and being responsive solely to said avalanche breakdown voltages provided by said signals from said transmitting device to assume said low impedance state and to provide a low impedance path between said transmitting device and said terminal only during the presence of said signals from said transmitting device, said second semiconductor device being connected in shunt in said first circuit across the input of said receiving device at a point an odd multiple of one-quarter wavelengths from said terminal with respect to said signals from said transmitting device so as to provide in the presence of said signals from said transmitting device said avalanche breakdown voltage across said second semiconductor device, a third unidirectional semiconductor current conducting device connected in shunt across said first circuit between said second semiconductor device and said receiving device, a first capacitor connected across said second semiconductor device, a second capacitor connected across said third semiconductor device, an inductor connected between like terminals of said second and said third semiconductor devices, said third semiconductor device being responsive to said signals from said transmitting device to assume a low impedance and switch the tuned circuit comprising said capacitor and said inductor in parallel with said second semiconductor device to provide a high impedance and said avalanche breakdown voltage only during the presence of said signals from said transmitting device across said second semiconductor device, whereby said receiver is prevented from loading said second semiconductor device, and said second semiconductor device being responsive solely to the presence of said avalanche breakdown voltage provided by said signals from said transmitting device to assume said low impedance state and provide a low impedance across said point an odd multiple one-quarter wavelength from said terminal and thereby providing a high impedance between said terminal and said receiving device so as to isolate said signals from said transmitting device from said receiving device.

7. A transmit-receive switch comprising in combination, a terminal suitable for connection to an antenna, a first circuit for applying input signals from said terminal to a receiving device, a second circuit for applying signals from a transmitting device to said terminal, first and second semiconductor devices each having an avalanche breakdown voltage at which a low impedance state is assumed and a critical sustaining current by which said low impedance state is maintained, said first semiconductor device being connected in series in said second circuit and being responsive solely to said avalanche breakdown voltage provided by said signals from said transmitting device to assume said low impedance state and to provide a low impedance path between said transmitting device and said terminal only during said signals from said transmitting device, said second semiconductor device being connected in shunt in said first circuit across the input of said receiving device, a third semicoductor device which operates as a low power switching device connected in shunt across said first circuit between said second semiconductor device and said receiving device, a first capacitor connected in shunt across said first circuit at said terminal, a second capacitor connected across said second semiconductor device, a first inductor connected between like terminals of said first and second capacitors, said first and second capacitors and said first inductor providing matching filter section between said terminal and said second semiconductor device, a third capacitor connected across said third semiconductor device, a second inductor connected between like terminals of said second and third semiconductor device, said third semiconductor device being responsive to said signals from said transmitting device to assume a low impedance and switch the tuned circuit comprising said second capaictor and said second inductor in parallel with said second semiconductor device and provide a high impedance and said avalanche breakdown voltage during the presence of said signals from said transmitting device across said second semiconductor device, whereby said receiving device is prevented from leading said second semiconductor device, and said second semiconductor device being responsive solely to said avalanche breakdown voltage provided by said signals from said transmitting device to assume said low impedance state and provide a low impedance across said second capacitor only during the presence of said signals from said transmitting device and switch the tuned circuit comprising said first capacitor and said first inductor in shunt across said first circuit at said terminal to provide a high impedance between said terminal and said receiving device so as to isolate said signals from said transmitting device from said receiving device.

8. A transmit-receive switch comprising in combination, a terminal suitable for connection to an antenna, a first circuit for applying input signals from said terminal to a receiving device, a second circuit for applying signals from a transmitting device to said terminal, first and second PNPN unidirectional devices each having an avalanche breakdown voltage at which the high impedance NP center junction is overcome and a low impedance state is assumed and a critical sustaining current by which said low impedance state is maintained, said first PNPN unidirectional semiconductor device being connected in series in said second circuit and being responsive solely to said avalanche breakdown voltages provided by said signals from said transmitting device to assume said low impedance state to provide a low impedance path between said transmitting device and said terminal only during the presence of said signals from said transmitting device, a first inductor connected across said first PNPN unidirectional semiconductor device so as to tune out the coupling capacitance across said first PNPN unidirectional device, said second PNPN unidirectional semiconductor device being connected in shunt in said first circuit at a point one-quarter wavelength from said terminal with respect to said signals from said transmitting device, a third semiconductor device which operates as a low power switching device connected in shunt in said first circuit between said second PNPN unidirectional semiconductor device and said receiving device, a first capacitor connected across said second semiconductor device, a second inductor connected between like terminals of said second PNPN unidirectional semiconductor device and said third semiconductor device, said third semiconductor device being responsive to said signals from said transmitting device to assume a low impedance and switch the tuned circuit comprising said first capacitor and said second inductor in parallel with said second PNPN unidirectional semiconductor device and provide a high impedance and said avalanche breakdown voltage during the presence of said signals from said transmitting device across said second PNPN unidirectional semiconductor device, whereby said receiver is prevented from loading said second PNPN unidirectional semiconductor device, and said second PNPN unidirectional semiconductor device being responsive solely to said avalanche breakdown voltage provided by said signals from said transmitting device to assume said low impedance state and provide a low impedance across said point an odd multiple of one-quarter wavelengths from said terminal and thereby provide a high impedance between said terminal and said receiving device so as to isolate said signals from said transmitting device from said receiving device.

9. A transmit-receive switch comprising in combination, a terminal suitable for connection to an antenna, a first circuit for applying input signals from said terminal to a receiving device, a second circuit for applying signals from a transmitting device to said terminal, first and second PNPN unidirectional semiconductor devices each having an avalanche breakdown voltage at which the high impedance center NP junction is overcome and a low impedance state is assumed and a critical sustaining current by which said low impedance state is maintained, said first PNPN unidirectional semiconductor device being connected in series in said second circuit and being responsive solely to said avalanche breakdown voltages provided by said signals from said transmitting device to assume said low impedance state to provide a low impedance path between said transmitting device and said terminal only during the presence of said signals from said transmitting device, a first inductor connected across said first PNPN unidirectional device so as to tune out the coupling capacitance across said first PNPN unidirectional device, said second PNPN unidirectional semiconductor device being connected in shunt in said first circuit, a first matching filter section connected between said terminal and said second PNPN unidirectional semiconductor device, a third semiconductor device which operates as a low power diode switching device connected in shunt across said receiving device between said second PNPN unidirectional semiconductor device and said receiving device, a second matching filter section connected between said second PNPN unidirectional semiconductor device and said third semiconductor device, said third semiconductor device being responsive to said signals from said transmitting device to assume a low impedance and tuning said second filter section to provide a high impedance in parallel with said second semiconductor device and provide said avalanche breakdown voltage during the presence of said signals from said transmitting device across said second PNPN unidirectional semiconductor device to prevent said receiver from loading said second PNPN unidirectional semiconductor device, and said second PNPN unidirectional semiconductor device being responsive solely to said avalanche breakdown voltage provided by said signals from said transmitting device to assume said low impedance state and provide a low impedance across said first filter section to tune said first filter section and provide a high impedance between said terminal and said receiving device only during the presence of said signals from said transmitting device.

10. A transmit-receive switch comprising in combination, a terminal suitable for connection to an antenna, a first circuit for applying input signals from said terminal to a receiving device, a second circuit for applying signals from a transmitting device to said terminal, first and second semiconductor devices each having an avalanche breakdown voltage at which a low impedance state is assumed and a critical sustaining current by which said low impedance state is maintained.

said first semiconductor device being connected in shunt in said first circuit across the input of said receiving device at a point with respect to said signals from said transmitting device to provide solely during transmission of said signals from said transmitting device in response to said avalanche breakdown voltvoltage a low impedance across the input of said receiving device, said first semiconductor device being connected an even multiple of one-half wavelengths from said receiving device so that the low impedance of said receiving device for off-channel signals will be reflected across said first semiconductor device to prevent said first semiconductor from responding to said off-channel signals, and said second semiconductor device being connected in series in said second circuit and being responsive solely to said signals from said transmitting device to assume said low impedance state to provide a low impedance path between said transmitting device and said terminal only during the presence of said signals from said transmitting device.

11. A transmit-receive switch comprising in combination, a terminal suitable for connection to an antenna, a first circuit for applying input signals from said terminal to a receiving device, a second circuit for applying signals from a transmitting device to said terminal, first and second PNPN unidirectional semiconductor devices each having an avalanche breakdown voltage at which the high impedance center NP junction is overcome and a low impedance state is assumed and a critical sustaining current by which said low impedance state is maintained, said first PNPN unidirectional semiconductor device being connected in series in said second circuit and being responsive solely to said avalanche breakdown voltages provided by said signals from said transmitting device to assume said low impedance state to provide a low impedance path between said transmitting device and said terminal only during the presence of said signals from said transmitting device, a first inductor connected across said first PNPN unidirectional semiconductor device so as to tune out the coupling capacitance across said first PNPN unidirectional device, said second PNPN unidirectional semiconductor device being connected in shunt in said first circuit at a point an odd multiple of one-quarter wavelengths from said terminal with respect to said signals from said transmitting device, a third semiconductor device which operates as a low power diode switching device connected in shunt across said input circuit between said second PNPN unidirectional semiconductor device and said receiving device, a first capacitor connected across said second semiconductor device, a second capacitor connected across said third semiconductor device, a second inductor connected between like terminals of said second PNPN unidirectional semiconductor device and said third diode semiconductor device, said third semiconductor device being responsive to said signals from said transmitting device to assume a low impedance and switch said first capacitor and said second inductor in parallel with said second PNPN unidirectional semiconductor device and provide a high impedance and said avalanche breakdown voltage during the presence of said signals from said transmitting device across said second PNPN unidirectional semiconductor device to prevent said receiver from loading said second PNPN unidirectional semiconductor device, said third semiconductor device being connected one-half wavelength at said receiving device operating frequency from said receiving device to present a low impedance for high-level off-channel signals across said third semiconductor device to prevent response of said third semiconductor to said high-level off-channel signals, said second PNPN unidirectional semiconductor device being responsive solely to said avalanche breakdown voltage provided by said signals from said transmitting device to assume said low impedance state and provide a low impedance across said point an odd multiple of one-quarter wavelengths from said terminal and thereby provide a high impedance between said terminal and said receiving device so as to isolate said signals from said transmitting device from said receiving device only during the presence of said signals from said transmitting device and not during the presence of said high-level off-channel signals.

12. A transmit-receive switch comprising in combination, a terminal suitable for connection to an antenna, a first circuit for applying input signals from said terminal to a receiving device, a second circuit for applying signals from a transmitting device to said terminal, first and second PNPN unidirectional semiconductor devices each having an avalanche breakdown voltage at which the high impedance center NP junction is overcome and a low impedance state is assumed and a critical sustaining current by which said low impedance state is maintained, said first PNPN unidirectional semiconductor device being connected in series in said second circuit and being responsive solely to said avalanche breakdown voltages provided by said signals from said transmitting device to assume said low impedance state and provide a low impedance path between said transmitting device and said terminal only during the presence of said transmitted signals, a first inductor connected across said first PNPN unidirectional semiconductor device so as to tune out the coupling capacitance across the first PNPN unidirectional device, said second PNPN unidirectional semiconductor device being connected in shunt in said first circuit, a matching filter section connected between said terminal and said second semiconductor device, a third semiconductor device which operates as a low power diode switching device connected in shunt across said first circuit between said second PNPN unidirectional semiconductor device and said receiving device, a second matching filter section connected between said second PNPN unidirectional semiconductor device and said third semiconductor device, said third semiconductor device being responsive to said signals from said transmitting device to assume a low impedance and to tune said second filter section to provide a high impedance in parallel with said second PNPN unidirectional semiconductor device and provide a high impedance and said avalanche breakdown voltage during the presence of said signals from said transmitting device across said second PNPN unidirectional semiconductor device to prevent said receiver from loading said second PNPN unidirectional semiconductor device, said third semiconductor device being connected one-half wavelength at said receiving device operating frequency from said receiving device to present a low impedance for high-level off-channel signals of said receiving device across the said third semiconductor device to prevent response of said third semiconductor device to said high-level off-channel signals, and said second PNPN unidirectional semiconductor device being responsive solely to said critical breakdown voltage provided by said signals from said transmitting device to assume said low impedance state to tune said first filter section to provide a high impedance between said terminal and said receiving device only during the presence of said signals from said transmitting device and not during the presence of said high-level off-channel signals.

References Cited

UNITED STATES PATENTS

| | | | |
|---|---|---|---|
| 3,117,241 | 1/1964 | Paynter et al. | 307—88.5 |
| 3,131,365 | 4/1964 | Hoover | 333—13 XR |

OTHER REFERENCES

TM11-673 "Generation and Transmission of Microwave Energy," Depart of the Army (1953), TK 6550 U69, pp. 96–98 relied upon.

AIEE Transaction Paper "An Investigation of the Dynamic Switching Properties of Four-Layer Diodes," McDuffie, Jr. et al. (paper No. 60-19), 1960, title page, pp. 1, 2 and 7 relied upon.

HERMANN KARL SAALBACH, *Primary Examiner.*

M. NUSSBAUM, *Assistant Examiner.*

U.S. Cl. X.R.

307—258, 324; 333—13